United States Patent
Ben-Itzhak et al.

(10) Patent No.: US 11,620,578 B2
(45) Date of Patent: Apr. 4, 2023

(54) UNSUPERVISED ANOMALY DETECTION VIA SUPERVISED METHODS

(71) Applicant: VMware, Inc., Palo Alto, CA (US)

(72) Inventors: Yaniv Ben-Itzhak, Afek (IL); Shay Vargaftik, Nazareth-Illit (IL)

(73) Assignee: VMWARE, INC., Palo Alto, CA (US)

( * ) Notice: Subject to any disclaimer, the term of this patent is extended or adjusted under 35 U.S.C. 154(b) by 282 days.

(21) Appl. No.: 16/924,020

(22) Filed: Jul. 8, 2020

(65) Prior Publication Data

US 2022/0012625 A1 Jan. 13, 2022

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | | |
|---|---|---|---|---|
| 9,165,051 B2* | 10/2015 | Masud | ................. | G06F 16/285 |
| 10,392,022 B1* | 8/2019 | Rau | ..................... | B60W 40/09 |
| 10,436,720 B2* | 10/2019 | He | ........................ | G06N 20/00 |
| 10,484,399 B1* | 11/2019 | Curtin | .................... | G06F 17/11 |
| 10,885,393 B1* | 1/2021 | Sirianni | ............... | G06K 9/6282 |
| 11,012,458 B2* | 5/2021 | Wright | ................ | H04L 63/1425 |
| 11,194,787 B2* | 12/2021 | Matyska | ............. | G06F 16/2365 |
| 11,252,016 B2* | 2/2022 | To | ............................ | G06N 20/00 |
| 11,386,075 B2* | 7/2022 | Schierz | ............. | G06Q 10/0635 |
| 2020/0336507 A1* | 10/2020 | Lee | ......................... | G06F 21/53 |

FOREIGN PATENT DOCUMENTS

WO   WO-2020185101 A9 *  1/2021

OTHER PUBLICATIONS

WO-2020185101-A9.*
Learning_under_Concept_Drift_Lu_2020_arXiv_pages_1-18.*

* cited by examiner

*Primary Examiner* — Michael I Ezewoko

(57) ABSTRACT

Techniques for implementing unsupervised anomaly detection via supervised methods are provided. In one set of embodiments, a computer system can train an unsupervised anomaly detection classifier using an unlabeled training data set and classify the unlabeled training data set via the trained version of the unsupervised classifier, where the classifying generates anomaly scores for the data instances in the unlabeled training data set. The computer system can further construct a labeled training data set that includes a first subset of data instances from the unlabeled training data set whose anomaly scores are below a first threshold and a second subset of data instances from the unlabeled training data set whose anomaly scores are above a second threshold. The computer system can then train a supervised anomaly detection classifier using the labeled training data set.

15 Claims, 8 Drawing Sheets

UNSUPERVISED ANOMALY DETECTION VIA SUPERVISED METHODS

BACKGROUND

In machine learning (ML), classification is the task of predicting, from among a plurality of predefined categories (i.e., classes), the class to which a given data instance belongs. A machine learning model that implements classification is referred to as an ML classifier. Examples of well-known supervised ML classifiers include random forest (RF), adaptive boosting, and gradient boosting, and an example of a well-known unsupervised ML classifier is isolation forest (IF).

Anomaly detection is a particular use case of classification that involves predicting whether a data instance belongs to a "normal" class or an "anomaly" class, under the assumption that most data instances are normal rather than anomalous. Anomaly detection is commonly employed in various applications/fields such as network monitoring, finance, medical diagnostics, and more. An ML classifier that is configured to perform anomaly detection is referred to as an anomaly detection classifier.

Anomaly detection and ML classification in general can be supervised, unsupervised, or semi-supervised (which combines aspects of the supervised and unsupervised approaches). Supervised anomaly detection involves learning how to predict anomalies via a labeled set of training data—in other words, a training data set in which each data instance includes a label indicating the correct class (normal or anomaly) of that data instance. In contrast, unsupervised anomaly detection involves learning how to predict anomalies via an unlabeled set of training data—in other words, a training data set in which each data instance includes only the features/attributes of that data instance, without a corresponding class label.

Generally speaking, supervised anomaly detection has the potential to achieve higher prediction quality (in terms of accuracy, precision, and recall) than unsupervised anomaly detection due to the labeled data set it uses for training. However, for many anomaly detection scenarios, anomalies cannot be identified in advance, or the process of labeling data instances for training is expensive and/or time consuming. Thus, unsupervised (rather than supervised) anomaly detection is used in these scenarios due to a lack of labeled training data.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for implementing unsupervised anomaly detection (i.e., anomaly detection that is based on unlabeled training data) via supervised methods. At a high level, these techniques involve receiving an unlabeled training data set X, training an unsupervised anomaly detection classifier $M_U$ using X, and classifying each unlabeled data instance in X via the trained version of $M_U$. The classification of each unlabeled data instance results in an anomaly score which indicates the likelihood, as predicted by trained classifier $M_U$, that the data instance is anomalous (or normal).

Upon classifying the unlabeled data instances in X via trained classifier $M_U$, a labeled training data set X' is constructed using the "obvious" normal and anomalous data instances, as determined by their corresponding anomaly scores. For example, data instances that have an anomaly score above a predefined high threshold may be considered obviously anomalous and thus added to X' with the class label "anomaly." Conversely, data instances that have an anomaly score below a predefined low threshold may be considered obviously normal and thus added to X' with the class label "normal."

Finally, a supervised anomaly detection classifier $M_S$ is trained using labeled training data set X', thereby generating a trained version of $M_S$, and trained classifier $M_S$ is deployed to detect anomalies in new, unlabeled data instances/sets. Because $M_S$ is a supervised rather than unsupervised classifier, this approach can result in better anomaly detection quality than using unsupervised classifier $M_U$ alone. The foregoing and other aspects of the present disclosure are described in further detail below.

2. High-Level Solution Description

Figure 1:
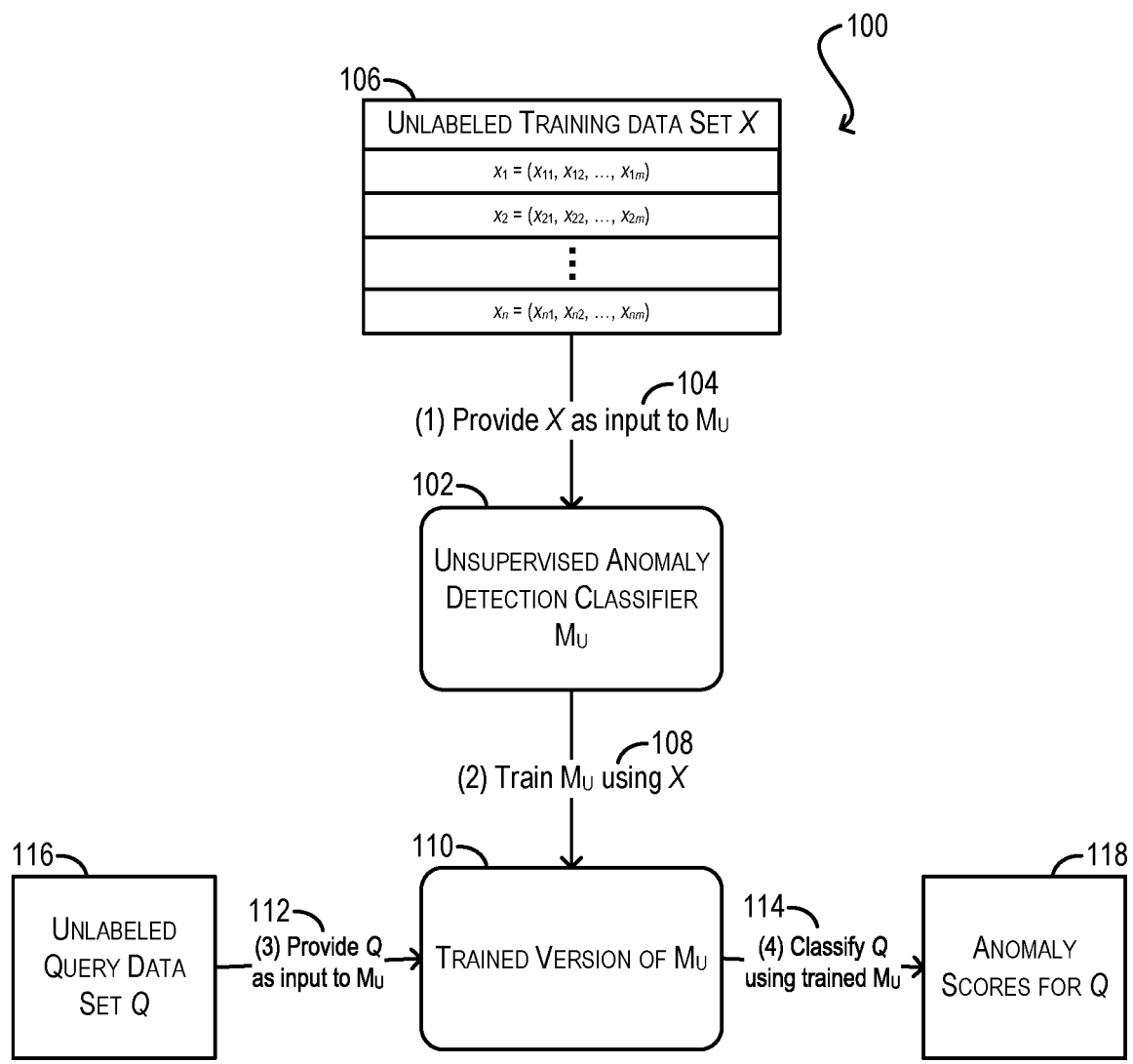
FIGS. 1 and 2 depict conventional processes for training and using unsupervised and supervised anomaly detection classifiers.
Figure 2:
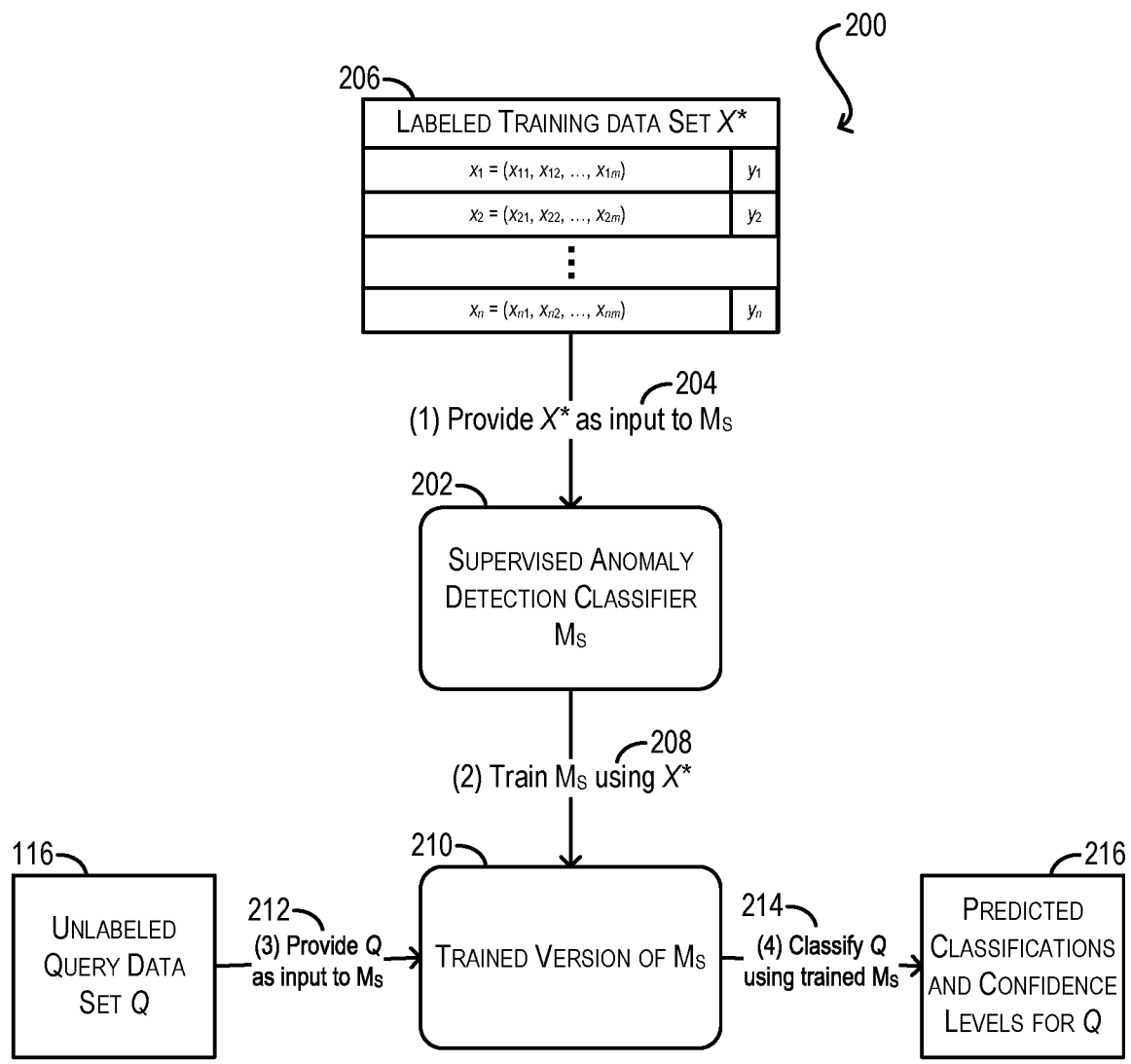

To provide context for the embodiments presented herein, FIGS. 1 and 2 depict exemplary unsupervised and supervised anomaly detection classifiers $M_U$ (reference numeral 102) and $M_S$ (reference numeral 202) respectively, along with conventional processes 100 and 200 for training and using these classifiers to perform anomaly detection. Unsupervised anomaly detection classifier $M_U$ of FIG. 1 may be any type of unsupervised ML classifier known in the art, such as an IF classifier. Similarly, supervised anomaly detection classifier $M_S$ of FIG. 2 may be any type of supervised ML classifier known in the art, such as an RF, adaptive boosting, or gradient boosting classifier.

Starting with FIG. 1, at step (1) (reference numeral 104), an unlabeled training data set X (reference numeral 106) is provided as input to unsupervised anomaly detection classifier $M_U$. As shown, unlabeled training data set X comprises n data instances where each data instance i for =1 . . . n includes a feature set $x_i$ comprising m features $(x_{i1}, x_{i2}, \ldots, x_{im})$. Each feature can be understood as an attribute of its corresponding data instance and will generally have a continuous (e.g., real/integer) or discrete (e.g., categorical) value. Unlabeled training data set X does not include any class labels.

At step (2) (reference numeral 108), unsupervised anomaly detection classifier $M_U$ is trained using unlabeled training data set X Because data set X lacks class labels, the training at this step is performed in a manner that takes into account the inherent distribution/statistics of the data instances in X. For example, in the case where $M_U$ is an IF classifier, $M_U$ will be trained to identify "isolated" data instances in X (i.e., those that deviate to a significant degree from other data instances) as being anomalies. Upon completing the training at step (2), a trained version of $M_U$ (reference numeral 110) is generated.

Finally, at steps (3) and (4) (reference numerals 112 and 114), an unlabeled query data set Q (reference numeral 116) is provided as input to the trained version of $M_U$ and trained classifier $M_U$ classifies the data instances in Q, resulting in an anomaly score for each data instance (reference numeral 118). In various embodiments, this anomaly score is a value between 0 and 1 that indicates the probability/likelihood that the data instance is anomalous (or normal). For instance, according to one implementation of $M_U$, an anomaly score close to 1 indicates that the data instance is very likely to be anomalous and an anomaly score close to 0 indicates that the data instance is very likely to be normal. In alternative implementations, the meaning of the anomaly score may be reversed (i.e., a value close to 1 indicates that the data instance is very likely to be normal and a value close to 0 indicates that the data instance is very likely to be anomalous).

Turning now to FIG. 2, at step (1) (reference numeral 204), a labeled training data set X* (reference numeral 206) is provided as input to supervised anomaly detection classifier $M_S$. Like unlabeled training data set X of FIG. 1, labeled training data set X* comprises n data instances where each data instance i for i=1 . . . n includes a feature set $x_i$ comprising m features $(x_{i1}, x_{i2}, \ldots, x_{im})$. However, unlike X, each data instance i in X* further includes a class label $y_i$ indicating the correct class (i.e., normal or anomaly) for feature set $x_i$/data instance i. For instance, with respect to data instance 1, the correct class for feature set $x_1$ is identified by label $y_1$.

At step (2) (reference numeral 208), supervised anomaly detection classifier $M_S$ is trained using labeled training data set X*. Generally speaking, this training entails configuring/building classifier $M_S$ in a manner that enables the classifier to correctly predict label $y_i$ for each data instance i in X*. Upon completing the training at step (2), a trained version of $M_S$ (reference numeral 210) is generated.

Finally, at steps (3) and (4) (reference numerals 212 and 214), query data set Q is provided as input to the trained version of $M_S$ and trained classifier $M_S$ classifies the data instances in Q, resulting in a predicted classification and confidence level for each data instance (reference numeral 216). The confidence level output at step (4) indicates the likelihood, as determined by trained classifier $M_S$, that the predicted classification (i.e., either normal or anomaly) is correct.

In some implementations, rather than outputting a classification and single confidence level for each data instance in unlabeled data set Q, the trained version of $M_S$ may output a class distribution vector that comprises a first probability value indicating the likelihood that the data instance is normal and a second probability value indicating the likelihood that the data instance is an anomaly. The sum of these first and second probability values is one. In these implementations, the predicted classification will correspond to the top-1 class in the vector (i.e., the class with the highest probability value).

Because supervised anomaly detection classifier $M_S$ has actual knowledge regarding the true (i.e., correct) class of each data instance it receives for training (whereas unsupervised anomaly detection classifier $M_U$ of FIG. 1 must infer which training data instances are anomalous based on their distribution/statistics), $M_S$ will generally be more effective and have better potential in terms of anomaly detection quality than $M_U$. However, as mentioned in the Background section, in many real-world anomaly detection scenarios there is simply not enough labeled training data available to train a supervised classifier. Thus, an unsupervised classifier must be used, potentially resulting in a loss of anomaly detection accuracy, precision, and/or recall.

Figure 3:
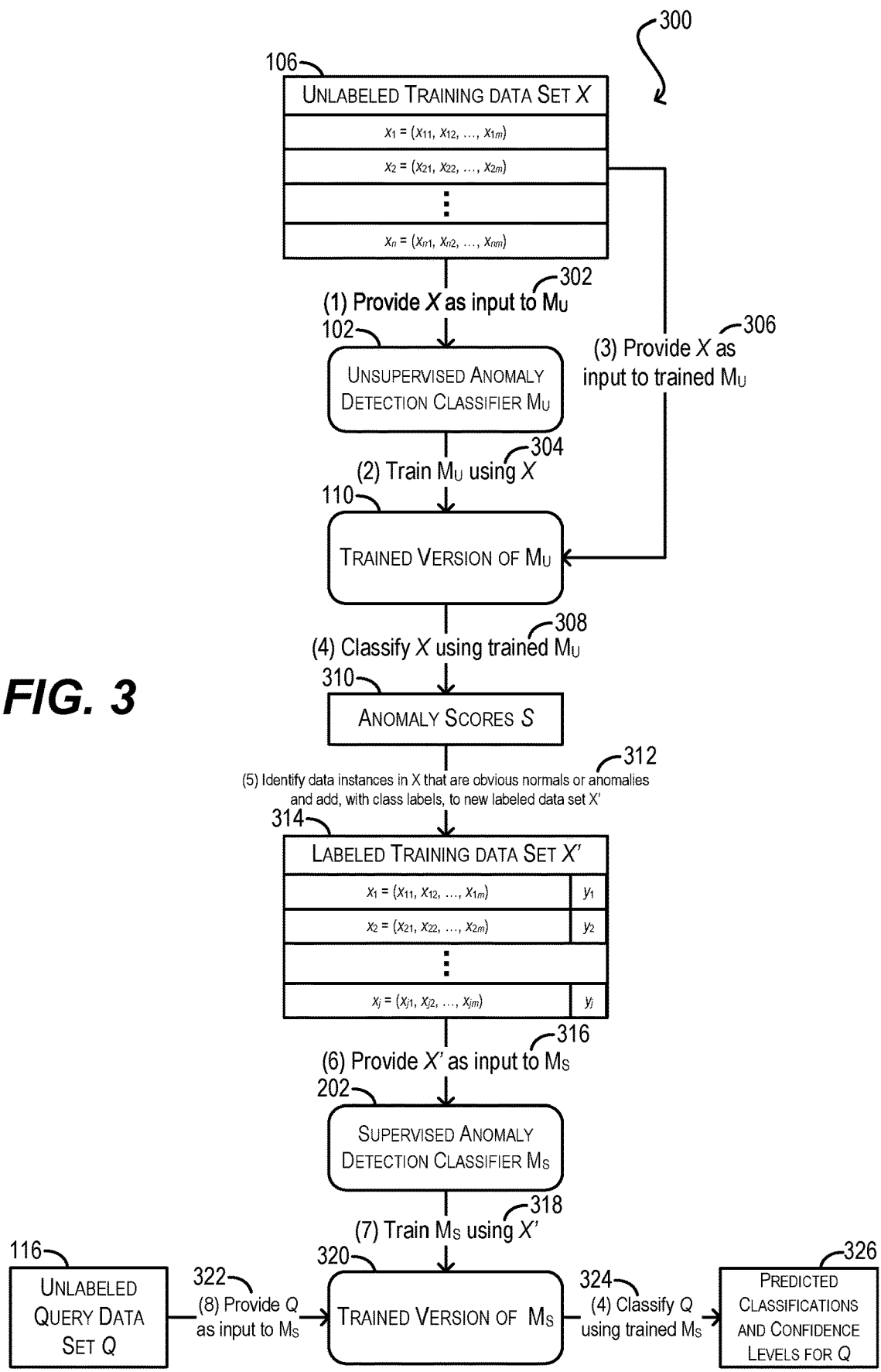
FIG. 3 depicts a process for implementing unsupervised anomaly detection via supervised methods according to certain embodiments.

To address this and other similar issues, FIG. 3 depicts a novel process 300 for implementing unsupervised anomaly detection that comprises leveraging both an unsupervised anomaly detection classifier (i.e., $M_U$ of FIG. 1) and a supervised anomaly detection classifier (i.e., classifier $M_S$ of FIG. 2). At steps (1) and (2) of process 300 (reference numerals 302 and 304), unlabeled training data set X is provided as input to unsupervised anomaly detection classifier $M_U$ and $M_U$ is trained on X, resulting in a trained version of $M_U$. Unlabeled training data set X is then provided as input to trained classifier $M_U$ (step (3); reference numeral 306) and trained classifier $M_U$ classifies the data instances in X (step (4); reference numeral 308), thereby generating a set of anomaly scores S (reference numeral 310) comprising an anomaly score $s_i$ for each data instance i in X.

At step (5) (reference numeral 312), anomaly score set S is used to identify data instances in unlabeled training data set X that are "obvious" normal or anomalous data instances and those identify data instances are added, with appropriate class labels y, to a new labeled training data set X' (reference numeral 314). For example, in one set of embodiments step (5) involves comparing anomaly score $s_i$ of each data instance i in X against low and high thresholds $t_l$ and $t_h$ respectively. If $s_i$ is below $t_l$, data instance i is added to X' with class label $y_i$ set to "normal"; on the other hand, if $s_i$ is above $t_h$, data instance i is added to X' with class label $y_i$ set to "anomaly" (or vice versa).

Then, at steps (6) and (7) (reference numerals 316 and 318), labeled training data set X' is provided as input to supervised anomaly detection classifier $M_S$ and $M_S$ is trained on X', resulting in a trained version of $M_S$ (reference numeral 320). Note that the trained version of $M_S$ here is different from the trained version in FIG. 2 because the training at step (7) is based upon the obvious normal and anomalous data instances determined by unsupervised classifier $M_U$.

Finally, unlabeled query data set Q is provided as input to the trained version of $M_S$ (step (8); reference numeral 322) and trained classifier $M_S$ classifies the data instances in Q (step (9); reference numeral 324), resulting in a predicted classification and confidence level for each data instance (reference numeral 326). Steps (8) and (9) may be subsequently repeated as needed for any additional incoming query data in order to detect anomalies in that data.

With the process shown in FIG. 3, it is possible to achieve better anomaly detection quality than the conventional unsupervised approach shown in FIG. 1. This is because supervised classifier $M_S$ identifies anomalies based on the specific values/ranges of data features (rather than observed/learned statistics), which is potentially more accurate and precise than unsupervised classifier $M_U$. At the same time, because the labeled data instances used to train $M_S$ are created from the output of $M_U$, process 300 advantageously avoids the need for actual (i.e., true) labeled training data, which is a significant limitation with the conventional supervised approach shown in FIG. 2.

It should be appreciated that process 300 of FIG. 3 is illustrative and not intended to limit embodiments of the present disclosure. For example, in one set of embodiments, the performance of supervised anomaly detection classifier $M_S$ can be further improved by updating the contents of labeled training data set X' via an iterative process (detailed in section (4) below).

In another set of embodiments, which may be implemented alone or in conjunction with the iterative updating of labeled training data set X', the anomaly scores generated by unsupervised anomaly detection classifier $M_U$ can be added as additional features to X'. In these embodiments (detailed in section (5) below), during the classification of query data set Q, the data instances in Q can be first classified using the trained version of $M_U$ in order to obtain the anomaly score of each data instance. The anomaly scores can then be added to the data instances of Q before they are classified using trained classifier $M_S$.

3. Training and Classification Workflow

Figure 4A:
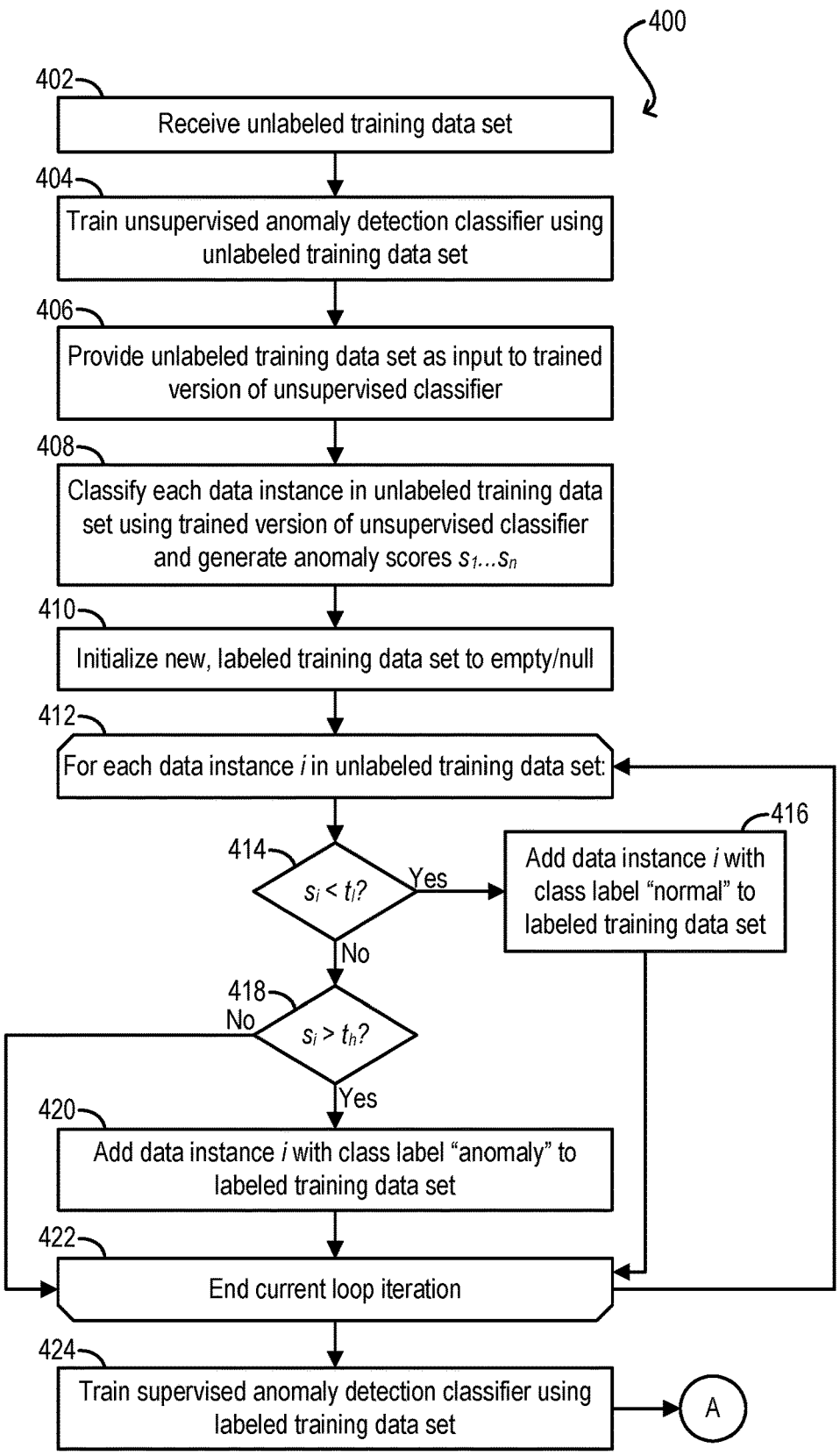
FIGS. 4A and 4B depicts a workflow of the process of FIG. 3 according to certain embodiments.
Figure 4B:
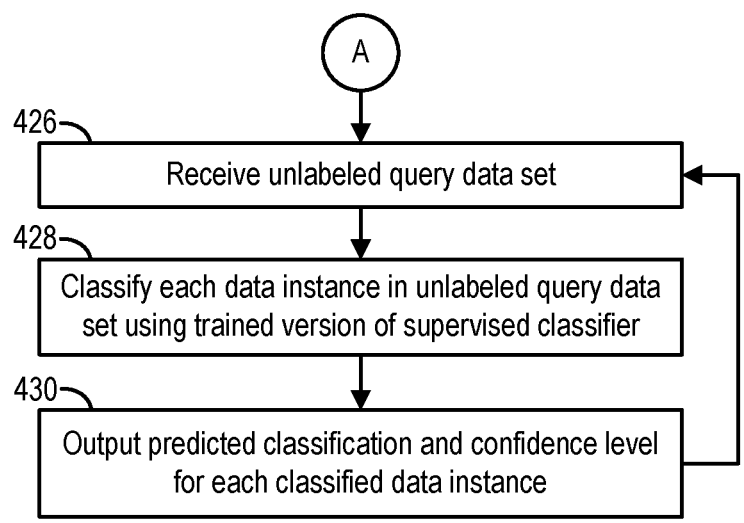

FIGS. 4A and 4B depict a workflow 400 that presents, in flowchart form, the training and classification process of FIG. 3 according to certain embodiments. As used herein, a "workflow" refers to a series of actions or steps that may be taken by one or more entities. For purposes of explanation, it is assumed that workflow 400 is executed by a single physical or virtual computing device/system, such as a server in a cloud deployment, a user-operated client device, an edge device in an edge computing network, etc. However, in alternative embodiments different portions of workflow 400 may be performed by different computing devices/systems. For example, in one set of embodiments the training of the unsupervised anomaly detection classifier, the training of the supervised anomaly detection classifier, and the classification of query data instances via the trained version of the supervised classifier may be executed by first, second, and third computing devices/systems respectively.

Starting with blocks 402 and 404 of FIG. 4A, a computing device/system can receive an unlabeled training data set (e.g., data set X of FIG. 3) and train an unsupervised anomaly detection classifier (i.e., classifier $M_U$ of FIG. 3) using the unlabeled training data set. As mentioned previously, this unlabeled training data set can include a plurality of data instances and a set of features/attributes for each data instance. The result of the training at block 404 is a trained version of the unsupervised classifier.

At blocks 406 and 408, the computing device/system can provide the unlabeled training data set as input to the trained unsupervised classifier and the trained unsupervised classifier can classify each data instance in the unlabeled training data set. As part of block 408, the trained unsupervised classifier can generate an anomaly score for each data instance which indicates the likelihood that the data instance is normal or anomalous. For instance, in a particular embodiment, a low anomaly score can indicate that the data instance is likely to be normal and a high anomaly score can indicate that the data instance is likely to be anomalous. In alternative embodiments, the opposite may be true.

At blocks 410 and 412, the computing device/system can initialize a new, labeled training data set (i.e., data set X' of FIG. 3) to empty/null and can enter a loop for each data instance i in the unlabeled training data set (for i=1 . . . n). Within this loop, the computing device/system can check whether the anomaly score for data instance i (i.e., $s_i$) is below a first (low) threshold $t_l$ (block 414). For example, if the range of anomaly scores is between 0 and 1, $t_l$ may be between 0 and 0.5. If the answer at block 414 is yes, the computing device/system can conclude that data instance i is obviously normal and thus add the data instance, along with a class label of "normal" (or some equivalent label), to the labeled training data set initialized at block 410 (block 416).

The computing device/system can further check whether the anomaly score for data instance i is above a second (high) threshold $t_h$ (block 418). For instance, in the example of above where $t_l$ is between 0 and 0.5, $t_h$ may be between 0.5 and 1. If the answer at block 418 is yes, the computing device/system can conclude that data instance i is obviously anomalous and thus add the data instance, along with a class label of "anomaly" (or some equivalent label), to the labeled training data set (block 420).

At block 422, the computing device/system can reach the end of the current loop iteration and return to block 412 in order to process any remaining data instances in the unlabeled training data set. At the conclusion of this loop, the labeled training data set will include all of the data instances that were deemed obviously normal or obviously anomalous. The computing device/system can then train a supervised anomaly detection classifier (e.g., classifier $M_S$ of FIG. 3) using the labeled training data set, resulting in a trained version of the supervised classifier (block 424), and proceed to the classification process depicted in FIG. 4B.

At block 426 of FIG. 4B, the computing device/system can receive a set of unlabeled query data instances (e.g., query data set Q of FIG. 3) that require classification/anomaly detection. In response, the computing device/system can classify each data instance in the set using the trained version of the supervised classifier (block 428). Finally, at block 430, the computing device/system can output a predicted classification and corresponding confidence level for each classified data instance and can return to block 426 in order to process further incoming query data sets.

Figure 5:
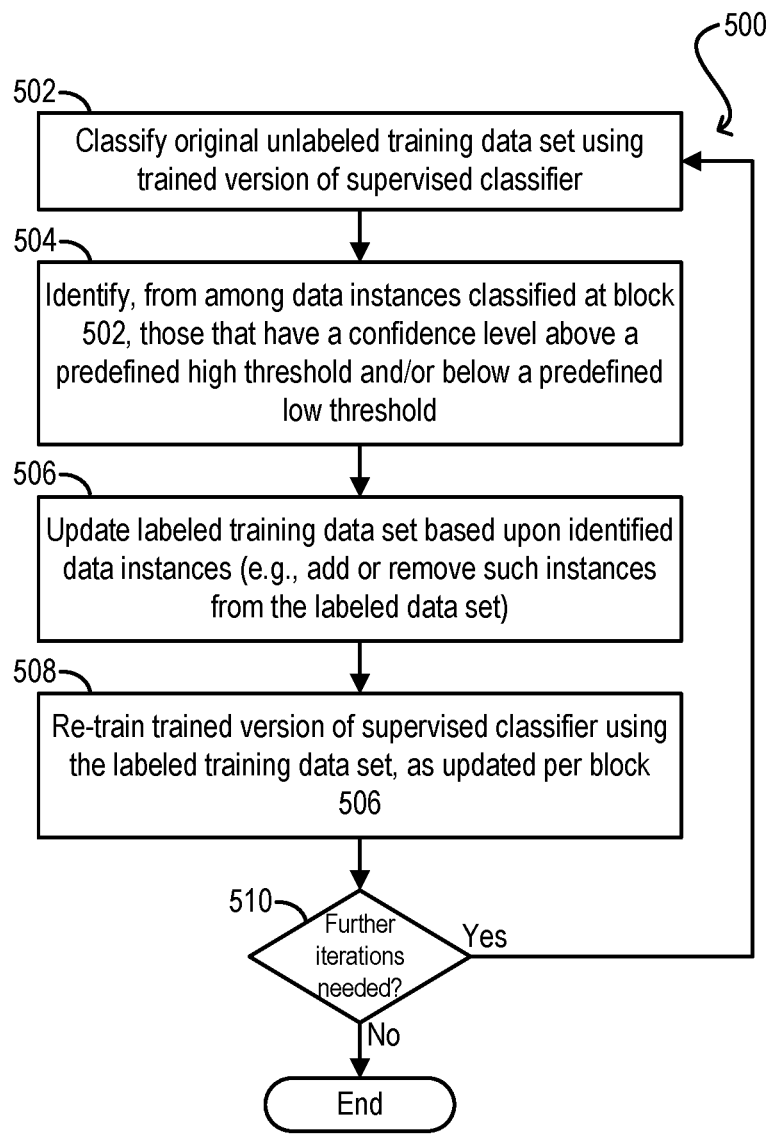
FIG. 5 depicts a workflow for iteratively updating a labeled training data set created via an unsupervised anomaly detection classifier according to certain embodiments.

4. Iteratively Updating the Labeled Training Data Set and Re-Training the Supervised Classifier In workflow 400, the supervised anomaly detection classifier is trained a single time via the labeled training data set and is thereafter used to classify query data. While this approach works well for many scenarios, it is also possible to further improve the performance of the supervised classifier by iteratively (1) classifying the data instances in the unlabeled training data set using the trained supervised classifier, (2) updating the labeled training data set based on the outcome of (1), and (3) re-training the supervised classifier via the updated labeled training data set. This iterative process is shown in FIG. 5 as workflow 500. Workflow 500 assumes that the supervised anomaly detection classifier has already been trained once in accordance with block 424 of workflow 400.

Starting with block 502, the computing device/system can use the trained supervised anomaly detection classifier to classify the original unlabeled training data set received at block 402 of workflow 400, thereby generating a predicted classification and confidence level for each data instance in that unlabeled data set.

At block 504, the computing device/system can identify, from among the data instances classified at block 502, those that have a confidence level above a predefined high threshold and/or below a predefined low threshold. The computing device/system can then update the labeled training data set (i.e., the data set constructed via loop 412 of workflow 400) based on the identified data instances (block 506). For example, for each data instance that is identified as having a confidence level above the predefined high threshold, the computing device/system can add that data instance (along with a class label corresponding to the data instance's predicted classification) to the unlabeled training data set, if not there already. Conversely, for each data instance that is identified as having a confidence level below the predefined threshold, the computing device/system can remove that data instance from the unlabeled training data set, if in the set.

Upon updating the labeled training data set, the computing device system can re-train the supervised anomaly detection classifier using the updated data set (block 508). The computing device/system can subsequently check whether any further iterations of the workflow are needed (block 510). In one set of embodiments, this check can be based on a criterion indicating the current quality of the supervised classifier. In other embodiments, this check can involve determining whether an iteration limit has been reached.

If the answer at block 510 is yes, the computing device/system can return to block 502 in order to repeat the steps above. Otherwise, the computing device/system can terminate the workflow.

5. Extending the Unlabeled Training Data Set with Anomaly Scores

As noted previously, in certain embodiments the unlabeled training data set used to train the supervised anomaly detection classifier can be extended with the anomaly scores generated by the unsupervised classifier, thereby improving the performance of the supervised classifier. This enhancement is illustrated in workflow 600 of FIGS. 6A and 6B, which is a modified version of workflow 400 depicted in FIGS. 4A and 4B.

Figure 6A:
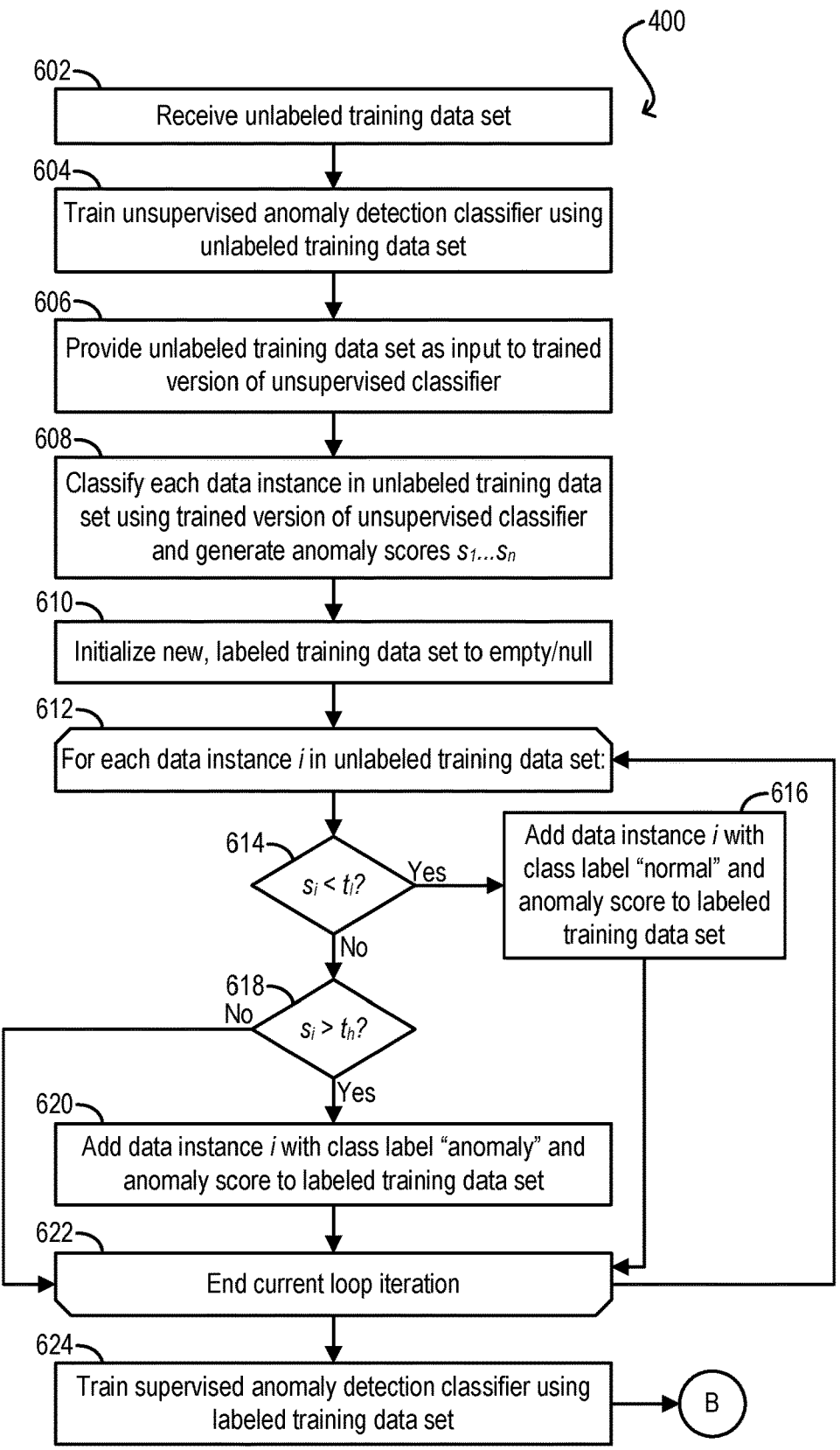
FIGS. 6A and 6B depict an alternative version of the workflow of FIGS. 4A and 4B according to certain embodiments.

With respect to FIG. 6A, blocks 602-624 are largely similar to blocks 402-424 shown in FIG. 4A. However, at the time of adding a data instance to the labeled training data set (i.e., blocks 616 and 620), the computing device/system can include the anomaly score generated by the unsupervised anomaly detection classifier as an additional feature/attribute to the data instance.

Figure 6B:
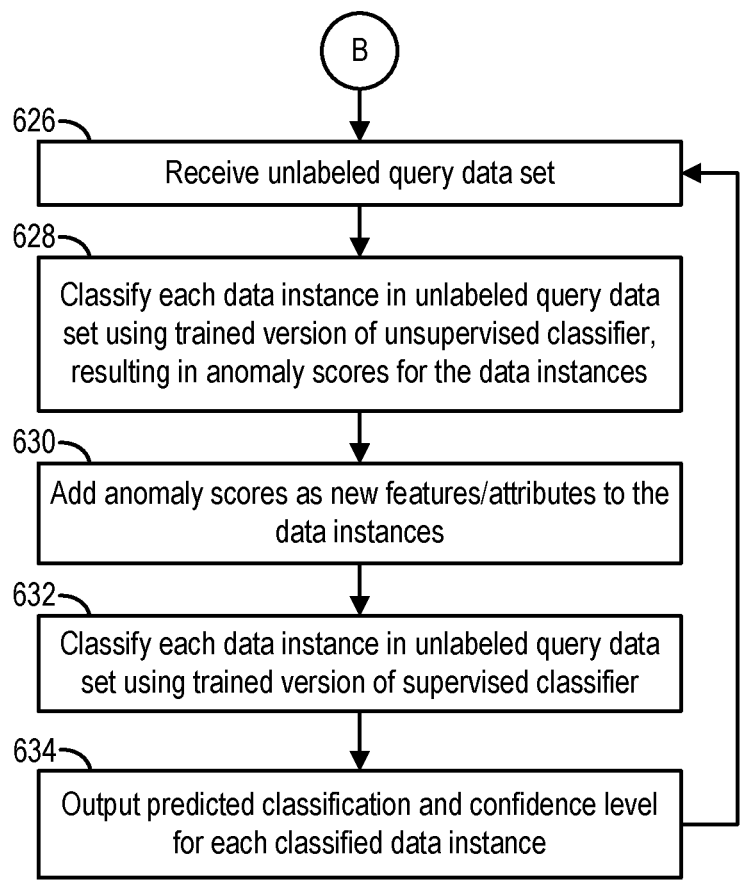

With respect to FIG. 6B, upon receiving the query data set at block 626, the computing device/system can first classify the data instances in the query data set using the trained unsupervised anomaly detection classifier, resulting in anomaly scores for the data instances (block 628). The computing device/system can then add the generated anomaly scores as an additional features/attributes to those data instances (block 630). Finally, at blocks 632 and 634, the computing device/system can classify the query data instances (with the anomaly scores added as new features) using the trained supervised anomaly detection classifier and output predicted classifications and confidence levels for those data instances.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    training, by a computer system, an unsupervised anomaly detection classifier using an unlabeled training data set comprising a plurality of unlabeled data instances, the training resulting in a trained version of the unsupervised anomaly detection classifier;
    classifying, by the computer system, the unlabeled training data set used to train the unsupervised anomaly detection classifier via the trained version of the unsupervised anomaly detection classifier, the classifying comprising, for each unlabeled data instance in the unlabeled training data set:

providing the unlabeled data instance as a query input to the trained version of the unsupervised anomaly detection classifier; and generating, via the trained version of the unsupervised anomaly detection classifier, an anomaly score for the unlabeled data instance;

constructing, by the computer system, a labeled training data set obtained from the trained version of the unsupervised anomaly detection classifier that is derived from a first subset of unlabeled data instances in the unlabeled training data set whose anomaly scores are below a first threshold and a second subset of unlabeled data instances in the unlabeled training data set whose anomaly scores are above a second threshold, the constructing comprising, for each unlabeled data instance in the unlabeled training data set:

upon determining that the anomaly score for the unlabeled data instance is below the first threshold, adding the unlabeled data instance as a new labeled data instance to the labeled training data set with a class label indicating that the new labeled data instance is normal; and upon determining that the anomaly score for the unlabeled data instance is above the second threshold, adding the unlabeled data instance as a new labeled data instance to the labeled training data set with a class label indicating that the new labeled data instance is anomalous;

training, by the computer system, a supervised anomaly detection classifier using the labeled training data set obtained from the trained version of the unsupervised anomaly detection classifier, the training resulting in a trained version of the supervised anomaly detection classifier;

receiving an unlabeled query data set comprising another plurality of unlabeled data instances; and classifying the unlabeled query data set via the trained version of the supervised anomaly detection classifier.

2. The method of claim 1 wherein the method further comprises, subsequently to training the supervised anomaly detection classifier:

classifying the unlabeled training data set used to train the unsupervised anomaly detection classifier via the trained version of the supervised anomaly detection classifier, the classifying comprising, for each unlabeled data instance in the unlabeled training data set:

providing the unlabeled data instance as a query input to the trained version of the supervised anomaly detection classifier; and generating, via the trained version of the supervised anomaly detection classifier, a predicted classification and a confidence level for the unlabeled data instance;

updating the labeled training data set based on the confidence levels generated as a result of classifying the unlabeled training data set via the trained version of the supervised anomaly detection classifier; and re-training the trained version of the supervised anomaly detection classifier using the updated labeled training data set.

3. The method of claim 2 further comprising repeating the classifying, the updating, and the re-training recited in claim 2 until a predefined criterion is met or a predefined iteration limit is reached.

4. The method of claim 1 wherein constructing the labeled training data set comprises, for each unlabeled data instance in the first and second subsets, adding the unlabeled data instance's anomaly score as an additional feature of the labeled data instance created from the unlabeled data instance.

5. The method of claim 4 wherein the method further comprises, prior to classifying the unlabeled query data set via the trained version of the supervised anomaly detection classifier:

classifying the unlabeled query data set via the trained version of the unsupervised anomaly detection classifier, the classifying resulting in anomaly scores for said another plurality of unlabeled data instances; and for each unlabeled data instance in the unlabeled query data set, adding the unlabeled data instance's anomaly score as an additional feature to the unlabeled data instance.

6. A non-transitory computer readable storage medium having stored thereon program code executable by a computer system, the program code causing the computer system to execute a method comprising:

training an unsupervised anomaly detection classifier using an unlabeled training data set comprising a plurality of unlabeled data instances, the training resulting in a trained version of the unsupervised anomaly detection classifier;

classifying the unlabeled training data set used to train the unsupervised anomaly detection classifier via the trained version of the unsupervised anomaly detection classifier, the classifying comprising, for each unlabeled data instance in the unlabeled training data set:

providing the unlabeled data instance as a query input to the trained version of the unsupervised anomaly detection classifier; and generating, via the trained version of the unsupervised anomaly detection classifier, an anomaly score for the unlabeled data instance;

constructing a labeled training data set obtained from the trained version of the unsupervised anomaly detection classifier that is derived from a first subset of unlabeled data instances in the unlabeled training data set whose anomaly scores are below a first threshold and a second subset of unlabeled data instances in the unlabeled training data set whose anomaly scores are above a second threshold, the constructing comprising, for each unlabeled data instance in the unlabeled training data set:

upon determining that the anomaly score for the unlabeled data instance is below the first threshold, adding the unlabeled data instance as a new labeled data instance to the labeled training data set with a class label indicating that the new labeled data instance is normal; and upon determining that the anomaly score for the unlabeled data instance is above the second threshold, adding the unlabeled data instance as a new labeled data instance to the labeled training data set with a class label indicating that the new labeled data instance is anomalous;

training a supervised anomaly detection classifier using the labeled training data set obtained from the trained version of the unsupervised anomaly detection classifier, the training resulting in a trained version of the supervised anomaly detection classifier;

receiving an unlabeled query data set comprising another plurality of unlabeled data instances; and classifying the unlabeled query data set via the trained version of the supervised anomaly detection classifier.

7. The non-transitory computer readable storage medium of claim 6 wherein the method further comprises, subsequently to training the supervised anomaly detection classifier:
  classifying the unlabeled training data set used to train the unsupervised anomaly detection classifier via the trained version of the supervised anomaly detection classifier, the classifying comprising, for each unlabeled data instance in the unlabeled training data set:
    providing the unlabeled data instance as a query input to the trained version of the supervised anomaly detection classifier; and
    generating, via the trained version of the supervised anomaly detection classifier, a predicted classification and a confidence level for the unlabeled data instance;
  updating the labeled training data set based on the confidence levels generated as a result of classifying the unlabeled training data set via the trained version of the supervised anomaly detection classifier; and
  re-training the trained version of the supervised anomaly detection classifier using the updated labeled training data set.

8. The non-transitory computer readable storage medium of claim 7 wherein the method further comprises repeating the classifying, the updating, and the re-training recited in claim 7 until a predefined criterion is met or a predefined iteration limit is reached.

9. The non-transitory computer readable storage medium of claim 6 wherein constructing the labeled training data set comprises, for each unlabeled data instance in the first and second subsets, adding the unlabeled data instance's anomaly score as an additional feature of the labeled data instance created from the unlabeled data instance.

10. The non-transitory computer readable storage medium of claim 9 wherein the method further comprises, prior to classifying the unlabeled query data set via the trained version of the supervised anomaly detection classifier:
  classifying the unlabeled query data set via the trained version of the unsupervised anomaly detection classifier, the classifying resulting in anomaly scores for said another plurality of unlabeled data instances; and
  for each unlabeled data instance in the unlabeled query data set, adding the unlabeled data instance's anomaly score as an additional feature to the unlabeled data instance.

11. A computer system comprising:
  a processor; and
  a non-transitory computer readable medium having stored thereon program code that, when executed, causes the processor to:
    train an unsupervised anomaly detection classifier using an unlabeled training data set comprising a plurality of unlabeled data instances, the training resulting in a trained version of the unsupervised anomaly detection classifier;
    classify the unlabeled training data set used to train the unsupervised anomaly detection classifier via the trained version of the unsupervised anomaly detection classifier, the classifying comprising, for each unlabeled data instance in the unlabeled training data set:
      providing the unlabeled data instance as a query input to the trained version of the unsupervised anomaly detection classifier; and
      generating, via the trained version of the unsupervised anomaly detection classifier, an anomaly score for the unlabeled data instance;
    construct a labeled training data set obtained from the trained version of the unsupervised anomaly detection classifier that is derived from a first subset of unlabeled data instances in the unlabeled training data set whose anomaly scores are below a first threshold and a second subset of unlabeled data instances in the unlabeled training data set whose anomaly scores are above a second threshold, the constructing comprising, for each unlabeled data instance in the unlabeled training data set:
      upon determining that the anomaly score for the unlabeled data instance is below the first threshold, adding the unlabeled data instance as a new labeled data instance to the labeled training data set with a class label indicating that the new labeled data instance is normal; and
      upon determining that the anomaly score for the unlabeled data instance is above the second threshold, adding the unlabeled data instance as a new labeled data instance to the labeled training data set with a class label indicating that the new labeled data instance is anomalous;
    train a supervised anomaly detection classifier using the labeled training data set obtained from the trained version of the unsupervised anomaly detection classifier, the training resulting in a trained version of the supervised anomaly detection classifier;
    receive an unlabeled query data set comprising another plurality of unlabeled data instances; and
    classify the unlabeled query data set via the trained version of the supervised anomaly detection classifier.

12. The computer system of claim 11 wherein the program code further causes the processor to, subsequently to training the supervised anomaly detection classifier:
  classify the unlabeled training data set used to train the unsupervised anomaly detection classifier via the trained version of the supervised anomaly detection classifier, the classifying comprising, for each unlabeled data instance in the unlabeled training data set:
    providing the unlabeled data instance as a query input to the trained version of the supervised anomaly detection classifier; and
    generating, via the trained version of the supervised anomaly detection classifier, a predicted classification and a confidence level for the unlabeled data instance;
  update the labeled training data set based on the confidence levels generated as a result of classifying the unlabeled training data set via the trained version of the supervised anomaly detection classifier; and
  re-train the trained version of the supervised anomaly detection classifier using the updated labeled training data set.

13. The computer system of claim 12 wherein the classifying, the updating, and the re-training recited in claim 12 are repeated until a predefined criterion is met or a predefined iteration limit is reached.

14. The computer system of claim 11 wherein the program code that causes the processor to construct the labeled training data set comprises program code that causes the processor to, for each unlabeled data instance in the first and second subsets:

add the unlabeled data instance's anomaly score as an additional feature of the labeled data instance created from the unlabeled data instance.

15. The computer system of claim 14 wherein the program code further causes the processor to, prior to classifying the unlabeled query data set via the trained version of the supervised anomaly detection classifier:

classify the unlabeled query data set via the trained version of the unsupervised anomaly detection classifier, the classifying resulting in anomaly scores for said another plurality of unlabeled data instances; and for each unlabeled data instance in the unlabeled query data set, add the unlabeled data instance's anomaly score as an additional feature to the unlabeled data instance.

* * * * *